(12) United States Patent
Casey et al.

(10) Patent No.: US 9,099,163 B1
(45) Date of Patent: Aug. 4, 2015

(54) HARD DISK DRIVE (HDD) MOUNTING SYSTEM FOR SHOCK AND VIBRATION

(71) Applicant: Western Digital Technologies, Inc., Irvine, CA (US)

(72) Inventors: Shawn E. Casey, San Jose, CA (US); David W. Niss, Boulder, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 12 days.

(21) Appl. No.: 13/918,847

(22) Filed: Jun. 14, 2013

Related U.S. Application Data

(60) Provisional application No. 61/785,587, filed on Mar. 14, 2013.

(51) Int. Cl.
*G11B 33/08* (2006.01)

(52) U.S. Cl.
CPC .................................... *G11B 33/08* (2013.01)

(58) Field of Classification Search
CPC .................................................... G11B 33/08
USPC ........................................... 360/97.19, 99.15
See application file for complete search history.

(56) References Cited

U.S. PATENT DOCUMENTS

| | | | |
|---|---|---|---|
| 5,216,582 A | 6/1993 | Russell et al. | |
| 5,223,996 A | 6/1993 | Read et al. | |
| 5,463,527 A * | 10/1995 | Hager et al. | 361/679.34 |
| 5,535,092 A | 7/1996 | Bang | |
| 5,777,821 A | 7/1998 | Pottebaum | |
| 5,958,212 A * | 9/1999 | Yamamura et al. | 205/723 |
| 6,288,866 B1 | 9/2001 | Butler et al. | |
| 6,567,265 B1 | 5/2003 | Yamamura et al. | |
| 6,751,092 B1 * | 6/2004 | Ohnishi et al. | 361/679.34 |
| 6,873,524 B2 | 3/2005 | Kaczeus, Sr. et al. | |
| 6,954,329 B1 | 10/2005 | Ojeda et al. | |
| 6,958,884 B1 | 10/2005 | Ojeda et al. | |
| D512,422 S | 12/2005 | Sato et al. | |
| 7,106,583 B2 | 9/2006 | Koh et al. | |
| 7,471,509 B1 | 12/2008 | Oliver | |
| 7,535,672 B2 | 5/2009 | Sega et al. | |
| 2004/0190193 A1 * | 9/2004 | Kuwajima | 360/97.01 |
| 2005/0007733 A1 * | 1/2005 | Byun et al. | 361/685 |
| 2005/0168929 A1 * | 8/2005 | Inoue et al. | 361/683 |
| 2005/0168935 A1 * | 8/2005 | Inoue et al. | 361/685 |
| 2008/0151421 A1 * | 6/2008 | Asakura et al. | 360/97.02 |
| 2008/0158712 A1 * | 7/2008 | Nakatani | 360/71 |
| 2011/0212281 A1 | 9/2011 | Jacoby et al. | |
| 2013/0155545 A1 * | 6/2013 | Casey et al. | 360/97.12 |

FOREIGN PATENT DOCUMENTS

JP     2003045168 A     2/2003

* cited by examiner

*Primary Examiner* — Craig A. Renner

(57) ABSTRACT

A disk drive assembly including a disk drive enclosure, a damping assembly including a first mounting sheet having a first side and a second side opposite the first side, at least one elastomeric cushion attached to the second side of the first mounting sheet, wherein the first side of the first mounting sheet of the damping assembly contacts a surface of the disk drive enclosure.

22 Claims, 4 Drawing Sheets

HARD DISK DRIVE (HDD) MOUNTING SYSTEM FOR SHOCK AND VIBRATION

FIELD

The present disclosure relates generally to information storage devices and in particular to sealed disk drive storage devices having a mounting system for shock and vibration.

BACKGROUND

Previous disk drive mounting systems involve frames or brackets with screws and/or individual bumpers disposed within the computer chassis structure. However, increasingly thinner notebooks and tablet computers has caused a reduction of the space available around the HDD previously allocated for absorbing shock and vibration.

There is therefore a need for a mounting system that can improve HDD performance and robustness in limited space environments.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
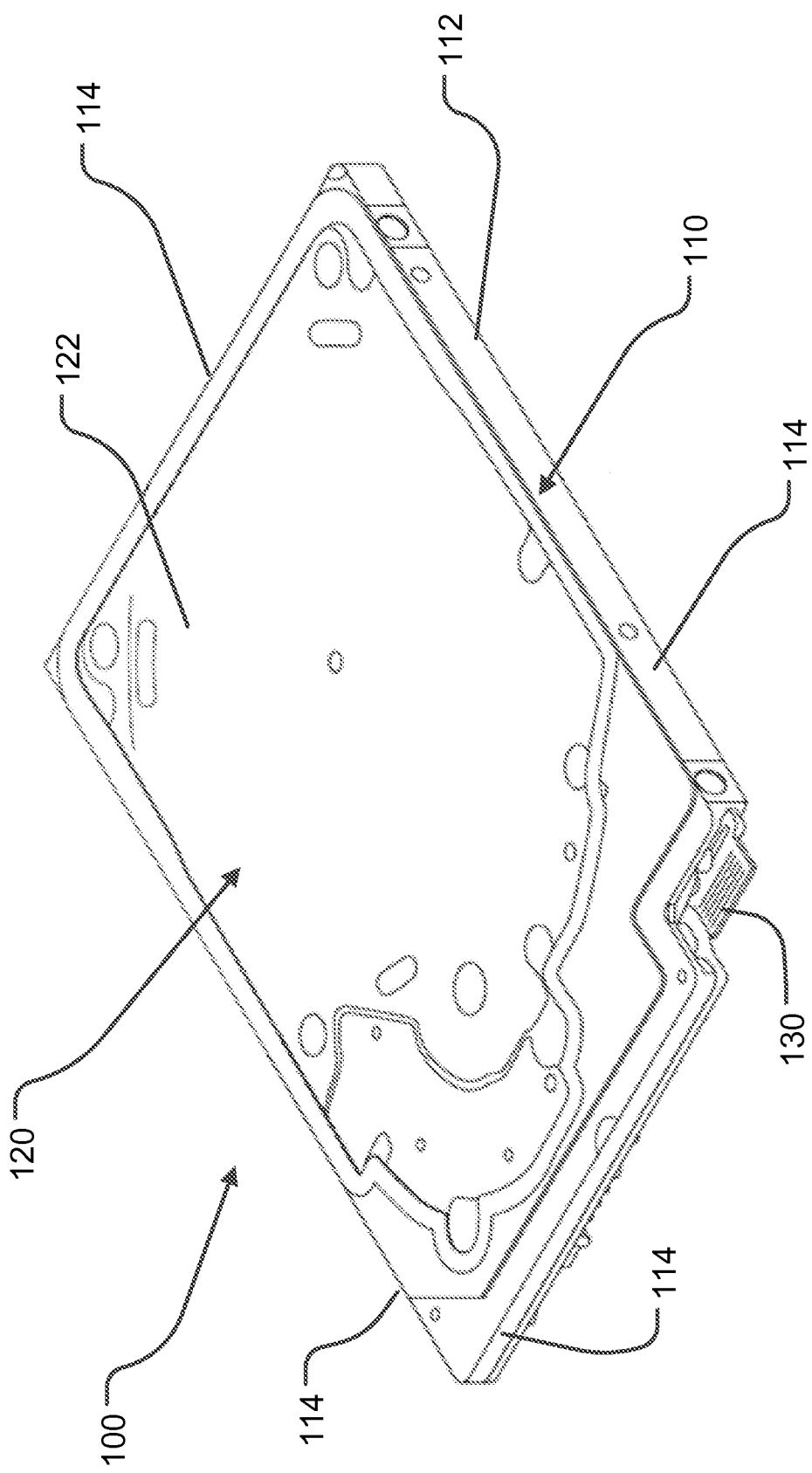
FIG. 1 is a perspective view of a sealed disk drive according to an embodiment of the present application.

FIG. 1 is a perspective view of a sealed disk drive enclosure 100 according to an embodiment of the present invention. The disk drive enclosure 100 includes a disk drive base 110, and a top cover 120. The disk drive base 110 includes a bottom surface 112 and four side surfaces 114. The disk drive enclosure 100 also includes an upper surface 122 of the top cover 120. In some embodiments, the disk drive enclosure 100 has a substantially rectangular shape. However, the disk drive enclosure 100 is not required to have a substantially rectangular shape and is not limited to any particular shape.

Additionally, the disk drive enclosure 100 may also include a terminal connector 130 disposed on at least one of the bottom surface 112, side surfaces 114, and upper surface 122 to allow the disk drive enclosure to be communicatively connected with other computer components. The type of terminal connector is not particularly limited and may include a USB connection, a Serial ATA connection, or any other type of connection apparent to a person of ordinary skill in the art. Alternatively, the disk drive enclosure 100 may be communicatively connected to other computer components via a wireless connection (i.e. a Wi-Fi connection, a Bluetooth connection, etc.)

Figure 2:
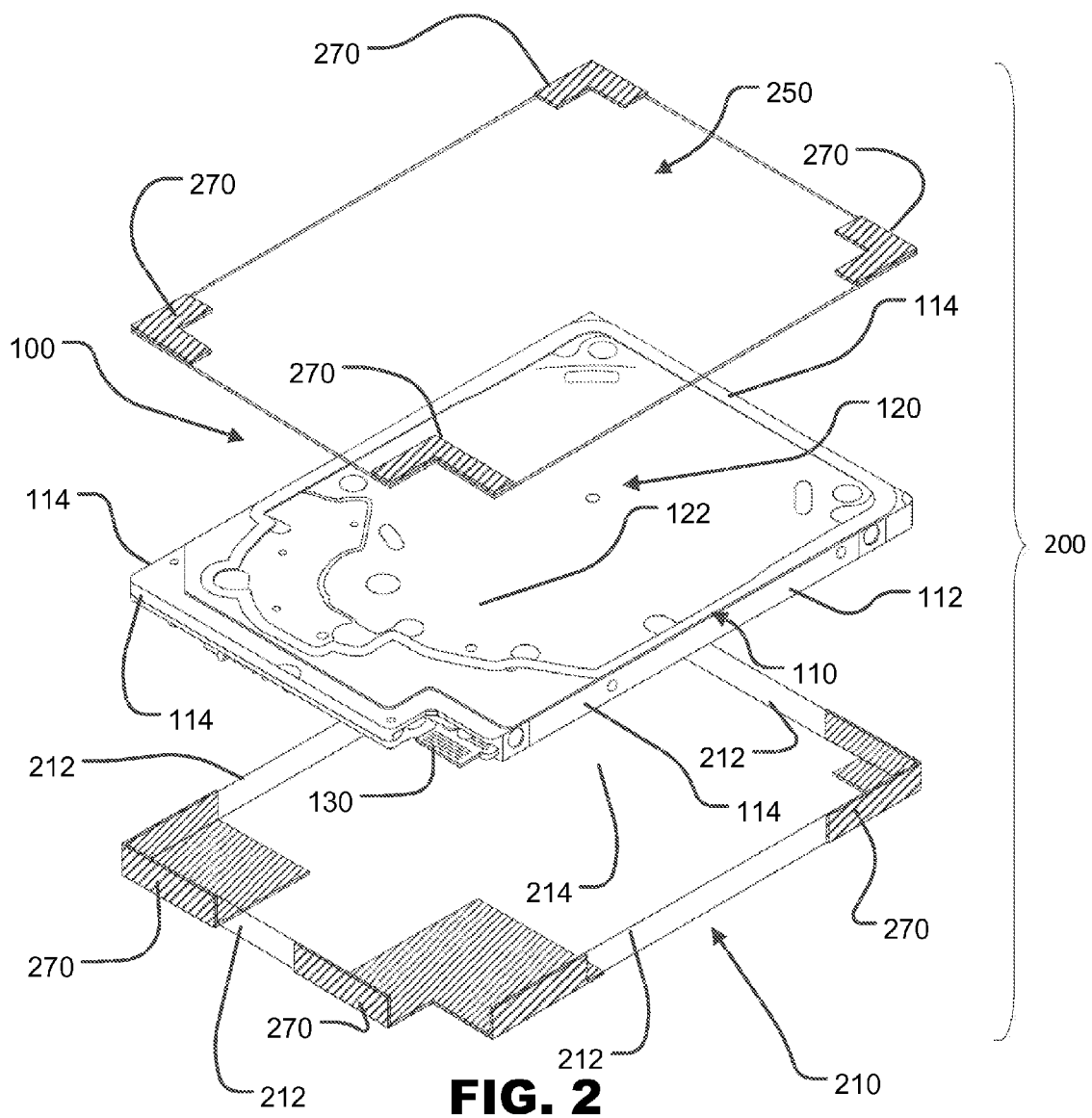
FIG. 2 is an exploded perspective view of the sealed disk drive of FIG. 1 and a damping assembly according to an embodiment of the present application.
Figure 3:
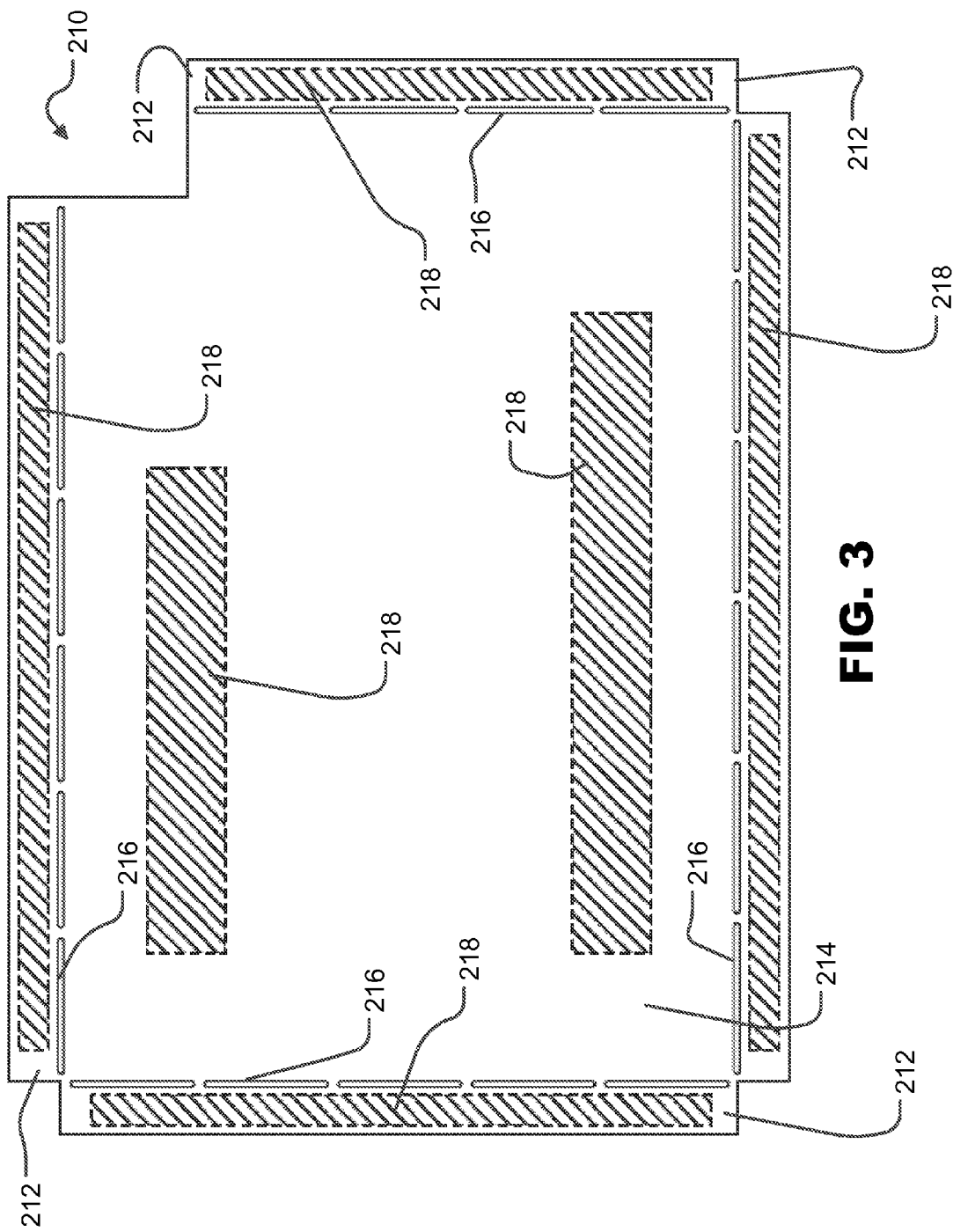
FIG. 3 is a top view of a mounting sheet of the damping assembly of FIG. 2.

FIG. 2 illustrates an exploded perspective view of the sealed disk drive enclosure 100 of FIG. 1 and a damping assembly 200 according to an embodiment of the present application. In this embodiment, the damping assembly 200 includes a first mounting sheet 210 and a second mounting sheet 250. Further, FIG. 3 provides a top view of the mounting sheet 210 of the damping assembly of FIG. 2. The first mounting sheet 210 is formed by a main panel 214 and four side panels 212, each side panel 212 being flexibly connected to the main panel 214. As shown, the flexible connection 216 between the side panels 212 and the main panel 214 allows the side panels 212 to move relative to the main panel 214. The flexible connections 216 may be formed by forming the connections 216 with perforations or by forming the connections 216 to have a thinner thickness than the side panels 212 and the main panel 214.

Further, the second mounting sheet 250 is formed as a single contiguous panel. Thus, in this embodiment, the first mounting sheet 210 is formed by a plurality of panels 212, 214 flexibly connected and the second mounting sheet 250 is formed by a single panel. However, embodiments of the present application are not limited to this configuration. Instead, in some embodiments, the second mounting sheet 250 may also be formed by a plurality of panels, the first mounting sheet 210 may also be formed by a single panel, or both mounting sheets 210, 250 may be formed by either a single panel or a plurality of panels. Additionally, in some embodiments, the damping assembly 200 may include only one mounting sheet, or the damping assembly 200 may include more than two mounting sheets.

The first and second mounting sheets 210, 250 may be formed from a Mylar material having sufficient flexibility to allow the panels 212, 214 to move relative to each other. However, embodiments of the present application are not limited to the mounting sheets 210, 250 being formed from Mylar, and may instead be formed from any material have sufficient flexibility to allow the panels 212, 214 to move relative to each other.

The first mounting sheet 210 is configured to contact a plurality of the surfaces 114, 112 of the disk drive enclosure 100. Specifically, the main panel 214 of the first mounting sheet 210 is configured to contact the bottom surface 112 of the disk drive enclosure 100 and the plurality of side panels 212 of the first mounting street 210 are configured to contact the side surfaces 114 of the disk drive enclosure 100. The flexible connections between the side panels 212 and the main panel 214 of the first mounting sheet 210 allow the side panels 212 and main panel 214 to conform to the side surfaces 114 and bottom surface 212 of disk drive enclosure 100.

Additionally, the second mounting sheet 250 is configured to contact the upper surface 122 of the disk drive enclosure 100. In this embodiment, the combination of the first and second mounting sheets 210, 250 collectively form the damping assembly 200 and contact all surfaces of the disk drive enclosure 100. However, embodiments of the present application can include a single mounting sheet that forms the damping assembly 200 that contacts all surfaces of the disk drive enclosure. Further, some embodiments of the present application may include 1 or more mounting sheets that form the damping assembly 200, but contact less than all of the surfaces of the disk drive enclosure.

Figure 4:
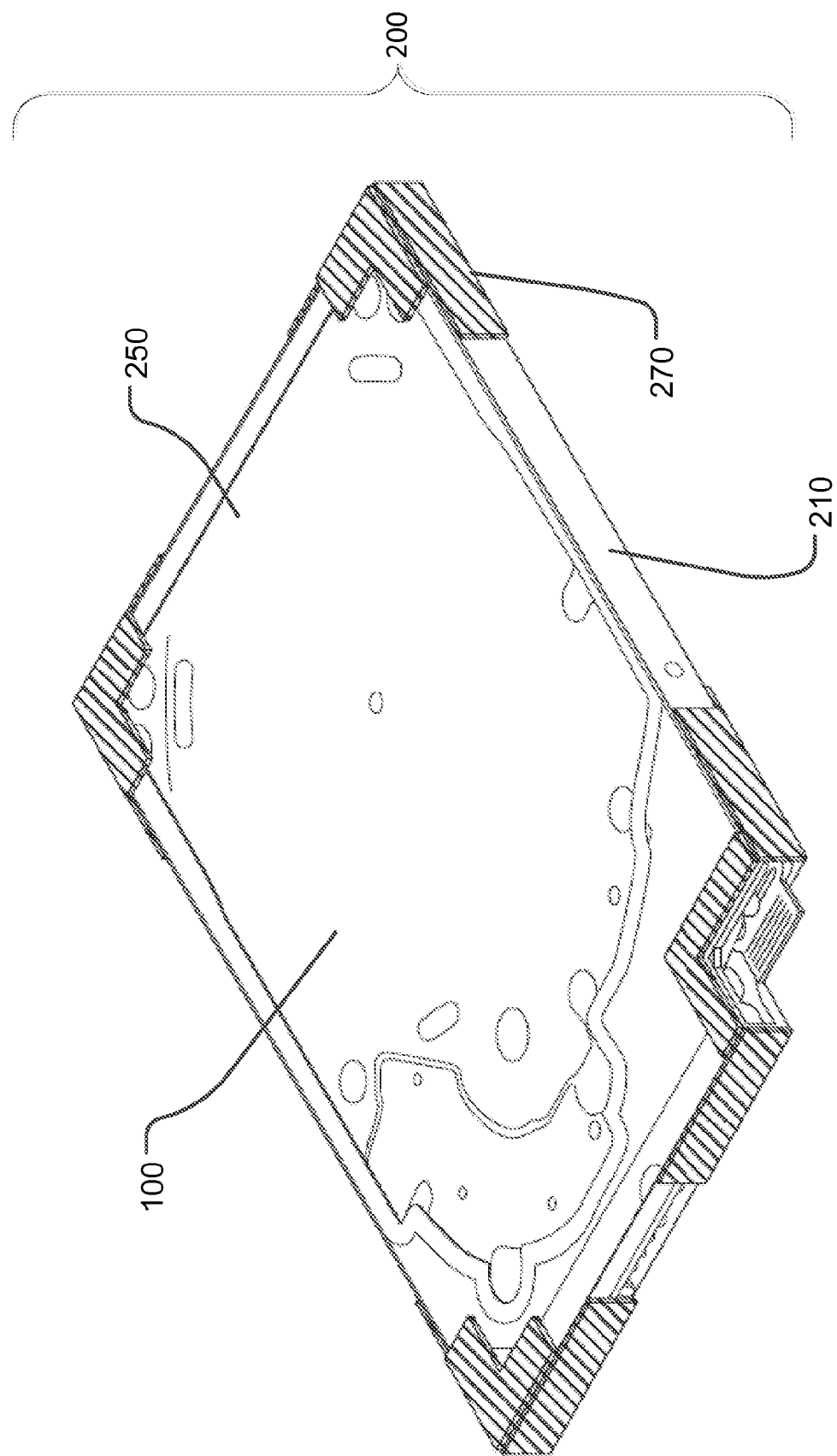
FIG. 4 is a perspective view of the sealed disk drive and damping assembly shown in FIG. 2.

In some embodiments, at least one of the main panel 214 and the side panels 212 of the first mounting sheet 210 may be attached to one or more of the surfaces 112, 114 of the disk drive enclosure 100. Additionally, the second mounting sheet 250 may be attached to the top surface 122 of the disk drive enclosure 100. The attachment could be achieved via an adhesive 218 (shown in FIG. 3) applied to an interior of the mounting sheets 210, 250 or by mechanical means such as a screw, a bolt, or other attaching mechanisms as would be apparent to a person of ordinary skill in the art. FIG. 4 illustrates a perspective view of the sealed disk drive enclosure 100 and damping assembly 200 shown in FIG. 2 in a fully assembly configuration.

Additionally, as shown in FIG. 2, the damping assembly 200 may include a plurality of elastomeric cushions 270 attached at various portions of the mounting sheets 210, 250. The elastomeric cushions 270 may be attached to a side of the mounting sheets 210, 250 that is opposite the sides of the mounting sheets 210, 250, which contact the disk drive enclosure 100. The placement of the elastomeric cushions 270 is not particularly limited and may be adjusted to optimize vibration and shock absorption based on the design and shape of the disk drive enclosure 100. The material construction of the elastomeric cushions 270 is not particularly limited and may include elastomeric materials, viscoelastic materials, open-cell foam materials, closed-cell foam materials, or any other shock or vibration absorbing material that would be apparent to a person of ordinary skill in the art.

While certain embodiments have been described, these embodiments have been presented by way of example only, and are not intended to limit the scope of the protection. Indeed, the novel apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A damping assembly comprising:
   a first mounting sheet having a flexible-sheet structure comprising a first side and a second side opposite the first side of the first mounting sheet;
   at least one elastomeric cushion attached to the second side of the first mounting sheet,
   wherein the first side of the mounting sheet of the damping assembly is configured to contact a first surface of a data storage device enclosure with the first mounting sheet being disposed between the at least one elastomeric cushion and the first surface of the data storage device enclosure, and
   wherein the first mounting sheet further comprises:
      a main panel, which contacts the first surface of the data storage device enclosure and
      a side panel flexibly connected to the main panel of the first mounting sheet, wherein the side panel of the first mounting sheet contacts a second surface of the data storage device enclosure, the second surface disposed adjacent to the first surface of the data storage device enclosure and at an angle with respect to the first surface of the data storage device enclosure, and
   wherein the at least one elastomeric cushion includes a first elastomeric cushion portion attached to the main panel and a second elastomeric cushion portion attached to the side panel, the first elastomeric cushion portion and the second elastomeric cushion portion forming a contiguous cushioned area.

2. The damping assembly of claim 1, wherein a first elastomeric cushion is attached to the main panel of the first mounting sheet and a second elastomeric cushion is attached to the side panel of the first mounting sheet.

3. The damping assembly of claim 1, wherein the first mounting sheet further comprises the main panel and a plurality of side panels, each side panel being flexibly connected to the main panel;
   wherein the main panel of the first mounting sheet is configured to contact the first surface of the data storage device enclosure; and
   wherein each of the plurality of side panels of the first mounting sheet is configured to contact one or more of a plurality of second surfaces of the data storage device enclosure, each of the plurality of second surfaces being disposed adjacent to the first surface.

4. The damping assembly of claim 3, wherein at least one elastomeric cushion is attached to each of the main panel and the plurality of side panels.

5. The damping assembly of claim 4, wherein the damping assembly further comprises:
   a second mounting sheet having a first side and a second side opposite the first side of the second mounting sheet, and
   at least one elastomeric cushion attached to the second side of the second mounting sheet; and
   wherein the first side of the second mounting sheet is configured to contact an opposite surface of the data storage device enclosure, the opposite surface being disposed on a side of the data storage device enclosure opposite the first surface of the data storage device enclosure.

6. The damping assembly of claim 3, wherein the damping assembly further comprises:
   a second mounting sheet having a first side and a second side opposite the first side of the second mounting sheet, and
   at least one elastomeric cushion attached to the second side of the second mounting sheet; and
   wherein the first side of the second mounting sheet is configured to contact an opposite surface of the data storage device enclosure, the opposite surface being disposed on a side of the data storage device enclosure opposite the first surface of the data storage device enclosure.

7. The damping assembly of claim 1, wherein the damping assembly further comprises:
   a second mounting sheet having a first side, and
   at least one elastomeric cushion attached to a second side of the second mounting sheet; and
   wherein the first side of the second mounting sheet is configured to contact an opposite surface of the data storage device enclosure, the opposite surface of the data storage device enclosure being disposed on a side of the data storage device enclosure opposite the first surface of the data storage device enclosure to which the first side of the first mounting sheet contacts.

8. The damping assembly of claim 7, wherein the first mounting sheet and the second mounting sheet collectively are configured to wrap around the data storage device enclosure and contact every exterior surface of the data storage device enclosure.

9. The damping assembly of claim 1, wherein the first mounting sheet is formed of a Mylar material.

10. The damping assembly of claim 1, wherein the elastomeric cushion is formed from a viscoelastic material.

11. The damping assembly of claim 1, wherein the first side of the first mounting sheet of the damping assembly is configured to adhere to at least one of the first surface and the second surface of the data storage device enclosure.

12. A disk drive assembly comprising:
   a disk drive enclosure comprising a first surface and a second surface disposed adjacent to the first surface and at an angle with respect to the first surface; and a damping assembly comprising:
- a first mounting sheet having a flexible-sheet structure comprising a first side and a second side opposite the first side of the first mounting sheet; and
- at least one elastomeric cushion attached to the second side of the first mounting sheet, wherein the first side of the first mounting sheet of the damping assembly contacts the first surface of the disk drive enclosure with the first mounting sheet being disposed between the at least one elastomeric cushion and the first surface of the disk drive enclosure, and wherein the first mounting sheet further comprises:
- a main panel, which contacts the first surface of the disk drive enclosure and
- a side panel flexibly connected to the main panel of the first mounting sheet, wherein the side panel of the first mounting sheet contacts the second surface of the disk drive enclosure, and wherein the at least one elastomeric cushion includes a first elastomeric cushion portion attached to the main panel and a second elastomeric cushion portion attached to the side panel, the first elastomeric cushion portion and the second elastomeric cushion portion forming a contiguous cushioned area.

13. The disk drive assembly of claim 12, wherein a first elastomeric cushion is attached to the main panel of the first mounting sheet and a second elastomeric cushion is attached to the side panel of the first mounting sheet.

14. The disk drive assembly of claim 12, wherein the disk drive enclosure comprises the first surface and a plurality of second surfaces, each second surface being disposed adjacent to the first surface;
- wherein the first mounting sheet further comprises the main panel and a plurality of side panels, each side panel being flexibly connected to the main panel;
- wherein the main panel of the first mounting sheet contacts the first surface of the disk drive enclosure; and
- wherein each of the plurality of side panels of the first mounting sheet contacts one or more of the plurality of second surfaces of the disk drive enclosure.

15. The disk drive assembly of claim 14, wherein at least one elastomeric cushion is attached each of the main panel and the plurality of side panels.

16. The disk drive assembly of claim 15, wherein the damping assembly further comprises:
- a second mounting sheet having a first side and a second side opposite the first side of the second mounting sheet, and
- at least one elastomeric cushion attached to the second side of the second mounting sheet; and
- wherein the first side of the second mounting sheet contacts an opposite surface of the disk drive enclosure, the opposite surface being disposed on a side of the disk drive enclosure opposite the first surface of the disk drive enclosure.

17. The disk drive assembly of claim 14, wherein the damping assembly further comprises:
- a second mounting sheet having a first side and a second side opposite the first side of the second mounting sheet, and
- at least one elastomeric cushion attached to the second side of the second mounting sheet; and
- wherein the first side of the second mounting sheet contacts an opposite surface of the disk drive enclosure, the opposite surface being disposed on a side of the disk drive enclosure opposite the first surface of the disk drive enclosure.

18. The disk drive assembly of claim 12, wherein the damping assembly further comprises:
- a second mounting sheet having an adhesive layer applied to a first side thereof, and
- at least one elastomeric cushion attached to a second side of the second mounting sheet, the second side of the second mounting sheet being opposite the first side of the second mounting sheet; and
- wherein the first side of the second mounting sheet contacts an opposite surface of the disk drive enclosure, the opposite surface of the disk drive enclosure being disposed on a side of the disk drive enclosure opposite the first surface of the disk drive enclosure to which the first mounting sheet contacts.

19. The disk drive assembly of claim 18, wherein the first mounting sheet and the second mounting sheet collectively are configured to wrap around the disk drive enclosure and contact every exterior surface of the disk drive enclosure.

20. The disk drive assembly of claim 12, wherein the first mounting sheet is formed of a Mylar material.

21. The disk drive assembly of claim 12, wherein the elastomeric cushion is formed from a viscoelastic material.

22. The disk drive assembly of claim 12, wherein the first side of the first mounting sheet of the damping assembly adheres to the first surface of the disk drive enclosure.

* * * * *